Oct. 27, 1953   R. C. VAN SICKLE   2,657,354
TESTING ARRANGEMENT FOR CIRCUIT INTERRUPTING DEVICES
Filed July 22, 1950   2 Sheets-Sheet 1

WITNESSES:
Robert C Baird
W. R. Crout

INVENTOR
Roswell C. Van Sickle.
BY
Ralph H Swingle
ATTORNEY

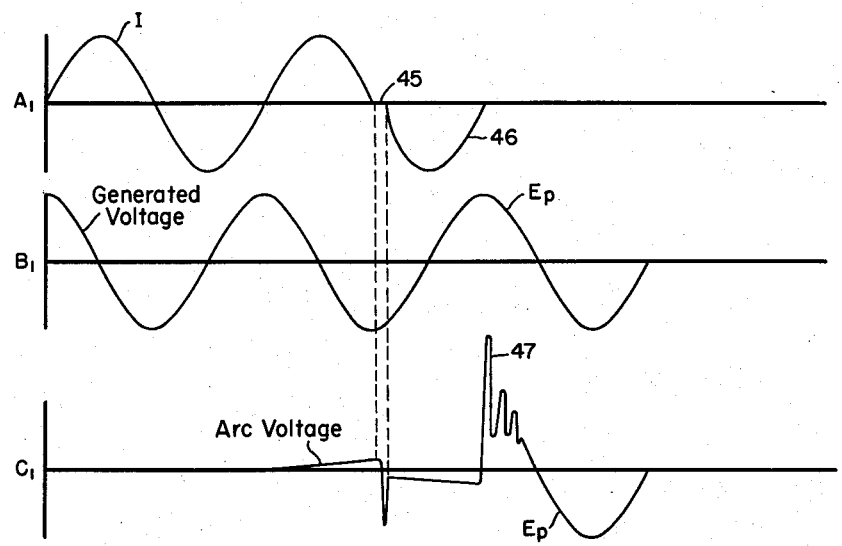

Patented Oct. 27, 1953

2,657,354

UNITED STATES PATENT OFFICE 2,657,354

TESTING ARRANGEMENT FOR CIRCUIT INTERRUPTING DEVICES

Roswell C. Van Sickle, Pittsburgh, Pa., assignor to Westinghouse Electric Corporation, East Pittsburgh, Pa., a corporation of Pennsylvania Application July 22, 1950, Serial No. 175,392

2 Claims. (Cl. 324—28)

My invention relates to testing devices and concerns particularly methods and devices for testing circuit interrupting devices at high apparent power on a low-power source.

It is an object of my invention to provide improved simply-operating apparatus for testing circuit breakers under conditions simulating the conditions of short circuit at rated apparent power as they occur in actual operation.

It is another object of my invention to provide apparatus for automatically applying to a circuit interrupting device a voltage surge simulating a recovery voltage transient at the instant when the current to be interrupted falls to zero.

It is a further object of my invention to provide a simple, reliable arrangement for applying to circuit interrupting devices a synthetic test subjecting them to the conditions which would take place if testing under actual operating conditions at full-line voltage.

In accordance with a simple form of my invention, I provide a relatively low-voltage high-current source for passing power current through a circuit breaker to be tested, and I provide a relatively low-power high-voltage source for supplying an additional voltage across the terminals of the breaker when it is opened to simulate the recovery voltage which would exist under full-voltage, full-power conditions. More specifically, I utilize an auto-transformer with the interrupting device under test connected across the secondary winding thereof and an auxiliary interrupting device connected electrically in both the primary and secondary circuits of the auto-transformer, with means for opening the two interrupting devices substantially simultaneously.

Further objects and advantages will readily become apparent upon reading the following specification when taken in conjunction with the accompanying drawings, in which:

Fig. 3 is a graph of the voltage and current conditions across the test breaker as a function of time for a second set of conditions.

Due to the high cost of circuit-breaker testing laboratories, methods of extending their range without corresponding increases in cost are desirable. The impressing of the heavy current at low voltage followed by a high voltage has been proposed for some types of circuits.

Methods proposed heretofore have the disadvantage of working at only one current zero or of impressing a restored voltage in the nature of an impulse, not followed by a sustained voltage wave. In my testing arrangement, I impress a heavy current at a low voltage, and follow it with a high voltage of normal frequency subsequent to the interruption. Should a restrike occur, it will result in heavy current flowing, and the recovery transient is repeated at subsequent current zeros.

Figure 1:
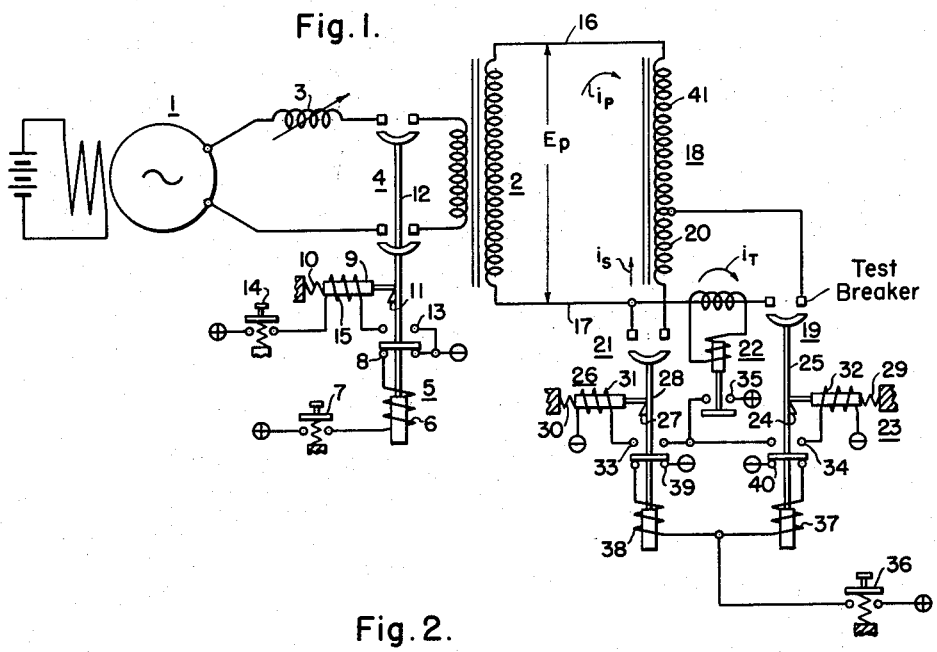
Figure 1 is a schematic circuit diagram illustrating one embodiment of my invention.

Referring to Fig. 1, the reference numeral 1 generally designates a generator for impressing an alternating voltage at relatively high potential to a transformer, generally designated by the reference numeral 2. The output circuit of the generator 1 includes a variable inductance 3 and a closing switch 4. The closing switch 4 is actuated toward the closed position by a solenoid device 5, the coil 6 of which is controlled by a push button 7. The circuit through the coil 6 includes back contacts 8 of the switch 4. Thus pressing the push button 7 will energize the coil 6 through the back contacts 8 of the switch 4 to the positive and negative terminals of the direct-current supply voltage.

Once the closing switch 4 is actuated to the closed position, the back contacts 8 are opened to deenergize the circuit of coil 6, and the switch 4 remains in the closed position by virtue of a latch 9 forced by a compression spring 10 to move under a nose 11 secured to and movable with the operating rod 12 of the closing switch 4. The closing switch 4 is hence latched in the closed position and causes engagement of the front contacts 13 associated with the switch 4.

To effect opening of the switch 4, the push button 14 is depressed to complete an electrical circuit through the coil 15 of the electrically actuated latch device 9 through the front contacts 13 of the switch 4. The energization of the coil 15 will electrically cause release of the latch 9 to permit the closing switch 4 to open by gravity.

From the foregoing it will be observed that the switch 4 controls the energization of a step-up transformer 2 which, through the lines 16, 17, energizes the auto-transformer, generally designated by the reference numeral 18. The interrupting device 19 under test is connected across the secondary winding 20 of the auto-transformer 18. Also, in accordance with my invention, I provide an auxiliary interrupting device 21 connected in the primary winding 41 and also connected electrically in series with the secondary winding 20 of the auto-transformer 18. Preferably, a current overload relay 22 is provided, responsive to the current passing through the load circuit of the auto-transformer 18, including the test breaker 19.

Actuation of the overload relay 22 causes substantially simultaneous opening of the test breaker 19 and the auxiliary breaker 21 by means hereinafter more fully described.

An electrically actuated latch device 23 is provided latching the test breaker 19 in its closed position, the latch 23 engaging a nose 24 associated with the operating rod 25 of the test breaker 19. Similarly, an electrically actuated latch device 26 engages a nose 27 secured to and movable with the operating rod 28 of the auxiliary breaker 21. Latches 23, 26 are respectively urged by compression springs 29, 30 to their latching positions. Substantially simultaneous release of the latches 23, 26 is effected by energization of their operating coils 31, 32 through the respective front contacts 33, 34 of the breakers 21, 19, this being effected by closure of the front contacts 35 of the overload relay 22.

The breakers 19, 21 in their open circuit position, as shown in the drawings, are moved substantially simultaneously to the closed circuit position by the depressing of a push button 36. The electrical circuit for energizing the operating coils 37, 38 of the respective breakers 19, 21 not only includes the push button 36, but also back contacts 39, 40, respectively, of breakers 21, 19.

The sequence of the testing operation is as follows: First, the test breaker 19 and the auxiliary breaker 21 are closed by depressing the push button 36. Closing of these two breakers automatically opens their coil circuits through the back contacts 39, 40, the latching devices 23, 26 maintaining them in their closed position.

Second, the closing switch 4 is closed by depressing the push button 7. Closing the push button 7 energizes the operating coil 6 to close the closing switch 4. The closing of the switch 4 automatically deenergizes the operating coil 6 through the back contacts 8, and permits the latch device 9 to hold the switch 4 in the closed position.

The closing of the closing switch 4 energizes the transformer 2 and also the auto-transformer 18, thereby sending a short-circuit current through both interrupting devices 19, 21. It will be noticed that the short circuit current $i_T$ through the test breaker 19 is equal to the current through the secondary winding 20, $i_s$, plus the current passing through the primary winding 41 of the auto-transformer 18, $i_p$ Third, the overload relay 22 operates from the overload current passing through the load circuit of the auto-transformer 18 including the test breaker 19, and hence energizes the trip coils 31, 32 of the latch devices 23, 26. This causes substantially simultaneous opening of the test breaker 19 and the auxiliary breaker 21.

Fourth, after the contacts have separated a specific distance the interrupting devices 19 and 21 are ready to extinguish the arcs and both will extinguish the arcs at the next current zero.

Fifth, the recovery voltage $E_P$ appears across both the test breaker 19 and the auxiliary breaker 21. Since the circuit is opened at switch 21, the auto-transformer 18 cannot function as an auto-transformer, but does function as a reactor between the power sources 1 and 2 and the test breaker 19. It acts as such during the recovery transient while the potential across the terminals of the test breaker 19 changes from the arc voltage to the voltage $E_P$. It will be noted that the auxiliary breaker 21 has carried less current than has flowed through the test breaker 19, it being observed that $$i_s = i_T - i_p$$

Sixth, the voltage may be removed from the test arrangement by opening the closing switch 4, that is, by depressing the push button 14.

Figure 2:
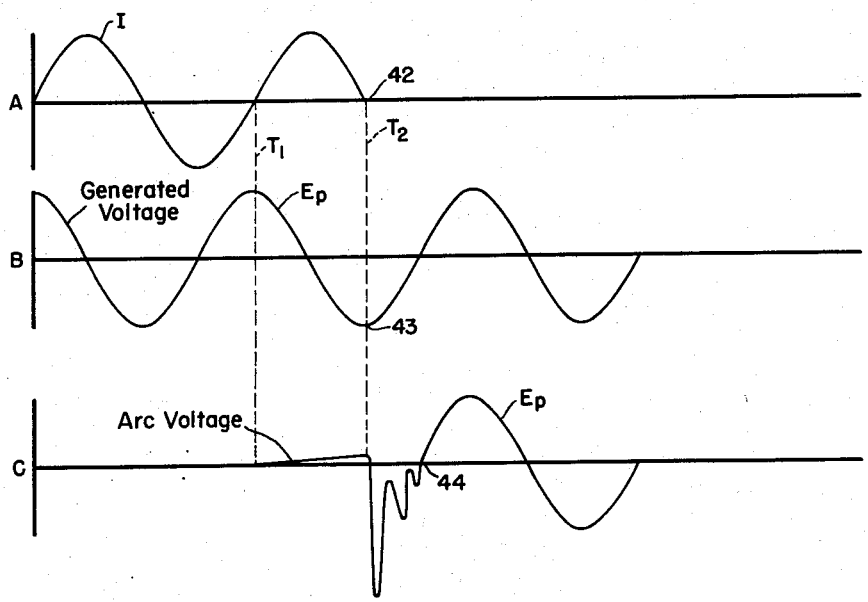
Fig. 2 is a graph of the voltage and current conditions across the test breaker as a function of time for one set of conditions.

Fig. 2 collectively shows a group of three curves A, B, and C. Curve A indicates the current flow, I, through the test breaker 19. The current flow I lags the generated voltage wave, as represented in curve B, by 90°, as indicated in Fig. 2. Assuming that the contacts of the test breaker 19 and the auxiliary breaker 21 open at, say the time T₁ of Fig. 2, the voltage across the breaker contacts of the test interrupter 9 will show arc voltage as indicated in curve C in Fig. 2.

At the time T₂ the contacts of the test breaker 19 and the auxiliary breaker 21 have opened sufficiently far to interrupt the circuit. Thus, the current wave I, represented by curve A comes to zero at the point 42, the generated voltage at this time being a maximum, as at 43. The voltage across the breaker attempts to assume the value of the alternating voltage $E_P$, but overshoots, as indicated in curve C, in an oscillatory manner, until at the point 44 it settles down to the generated voltage wave $E_P$.

The foregoing set of conditions, as shown in Fig. 2, assumes a state of affairs in which the current is extinguished in both breakers 19, 21 at the first current zero after contact part.

In case the arcs reignite within the breakers 19, 21, there will occur another half cycle of arcing, as shown in Fig. 3. Consequently, Fig. 3 shows a set of conditions in which the arcs have reignited after the first current zero, there then ensuing another half cycle of arcing. As shown in curve A₁, after a slight current zero pause, as at 45, there occurs another half cycle of arcing 46. The oscillatory recovery voltage transient 47 occurs a half cycle later, as indicated in curve C₁.

From the foregoing Figs. 2 and 3 it will be seen that the same conditions reoccur at subsequent current zeros until the arcs within the interrupters 19, 21 are extinguished.

Preferably, the auxiliary breaker 21 and the breaker 19 on test are parts of the same breaker, operating simultaneously. They may, however, be separate interrupters operated independently but substantially simultaneously.

The opening of the auxiliary breaker 21 causes the transformer 18 to cease operating as an auto-transformer between a high-voltage primary and a low-voltage high-current secondary and to start operating as a reactor in a high-voltage circuit. This changes the circuit containing the breaker 19 on test from a low-voltage high-current circuit to a high-voltage circuit. The recovery transient is that of the high voltage circuit, namely, $E_P$. It is, of course, recognized that higher voltage recovery rates may be obtained with lower power supply inductance and less capacitance, but these quantities can be measured and taken into consideration in the analysis of data. The transient will be a normal transient for a high voltage circuit.

If the breakers 19, 21 are not ready to interrupt, the arcs will restrike and the short circuit will then be reestablished and will continue until the next current zero.

If only the auxiliary breaker restrikes, the applied voltage on the test breaker 19 is reduced to the lower test voltage and the test in an entirety is considered a failure, but not a failure of the test breaker. Due to the need for extinction of the auxiliary breaker arc as soon as the extinction of the test breaker arc is accomplished, there may be provided a slight difference in adjustment of the pole units 19, 21 to provide slightly more gap for the auxiliary breaker 21.

It is believed that the testing arrangement of my invention has the following advantages over the existing test circuits of this nature:

1. It functions at current zero and if the arc restrikes functions at the next current zero.

2. It impresses a normal sequence restored voltage across the test breaker 19 and not a restored voltage in the nature of an impulse.

3. The testing arrangement starts the high voltage transient as soon as the arc is extinguished in both breakers 19, 21. If the arc goes out before a normal current zero, the voltage will rise in the negative direction and on the high voltage recovery transient.

4. There is no delay in impressing the transient upon the arc space.

5. The testing arrangement is very simple. Other systems require a surge generator for each current zero at which they function or will operate at only one current zero.

From the foregoing description of one embodiment of my invention, it will be apparent that I have provided an improved apparatus for testing circuit interrupting devices. The test arrangement is simple and effective. It simulates conditions obtained in the field. I have found that results obtained, in the nature of oscillograms of the voltage across the test breaker, utilizing the testing arrangement herein disclosed correspond remarkably well with similar oscillographic results obtained testing breakers out in the field.

Although I have shown and described a specific testing arrangement, it is clearly to be understood that the same was merely for the purpose of disclosure, and that changes in modifications may readily be made therein by those skilled in the art without departing from the spirit and scope of the appended claims.

I claim as my invention:

1. Apparatus for testing circuit interrupting devices comprising in combination, an auto-transformer, an interrupting device under test connected across the secondary winding of the auto-transformer, means for impressing an alternating voltage across the auto-transformer, an auxiliary interrupting device connected electrically in both the primary and secondary circuits of the auto-transformer, and means for opening the two interrupting devices substantially simultaneously.

2. Apparatus for testing circuit interrupting devices comprising in combination, a testing circuit including an auto-transformer, an interrupting device under test connected across the secondary winding of the auto-transformer, means for impressing an alternating voltage across the auto-transformer, an auxiliary interrupting device connected electrically in the part of the circuit common to the primary and secondary circuits, an overload relay responsive to the magnitude of the current in the secondary circuit of the auto-transformer, and means responsive to the actuation of the overload relay for substantially simultaneously opening the two interrupting devices.

ROSWELL C. VAN SICKLE.

References Cited in the file of this patent

UNITED STATES PATENTS

| Number | Name | Date |
|---|---|---|
| 1,898,752 | Wellings et al. | Feb. 21, 1933 |
| 2,088,445 | Skeats | July 27, 1937 |
| 2,104,629 | Willheim et al. | Jan. 4, 1938 |
| 2,288,331 | Skeats | June 30, 1942 |
| 2,456,541 | Stoecklin | Dec. 14, 1948 |